March 12, 1940. F. CORDERO 2,192,895
OXYGEN FLOW REGULATOR FOR AIRCRAFT
Filed March 4, 1938 2 Sheets-Sheet 1

INVENTOR
FIDEL CORDERO
BY Ransom H. Davis
ATTORNEY

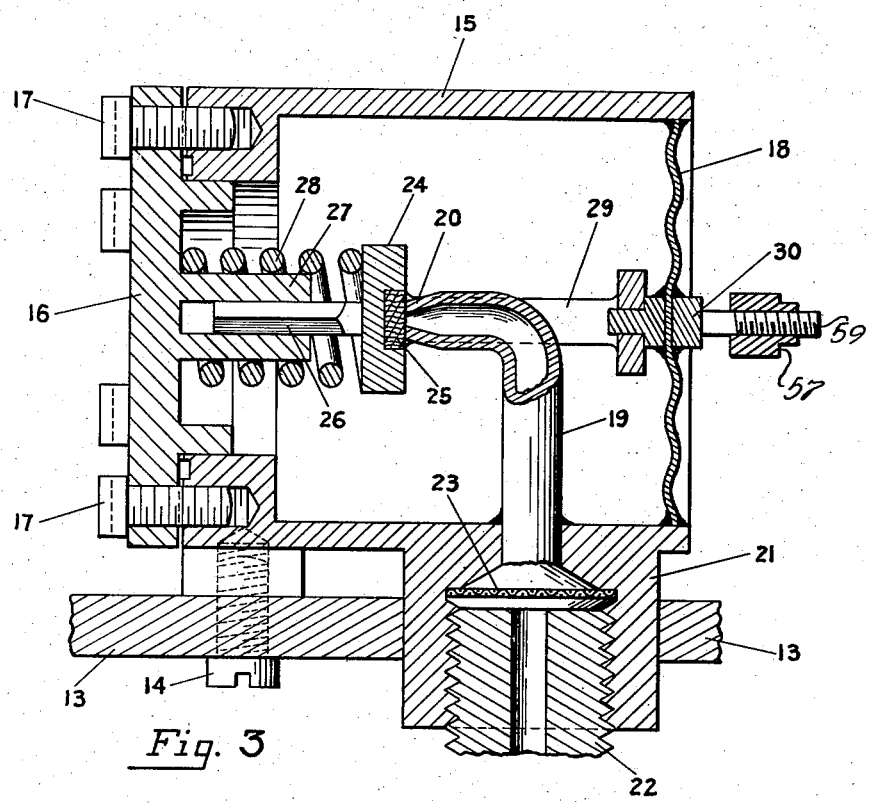
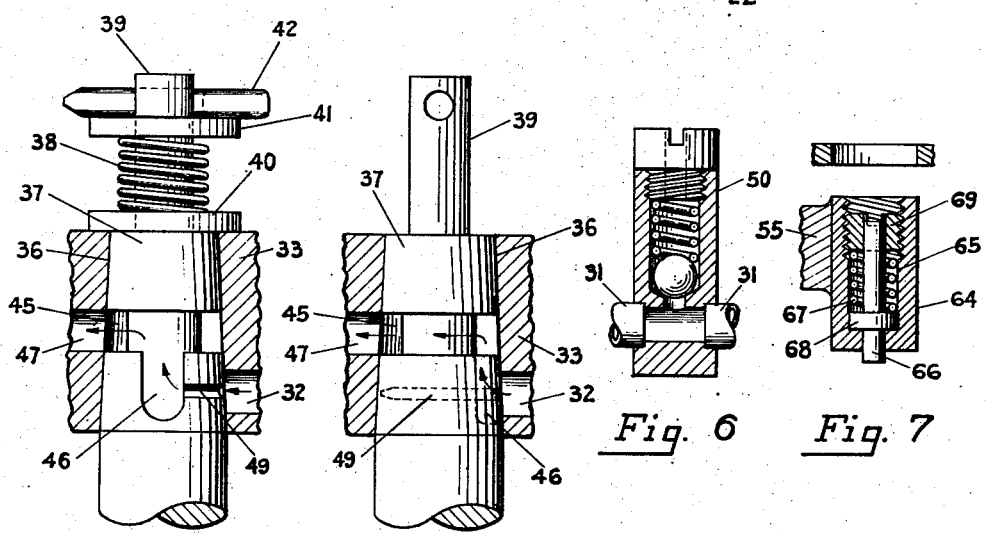

Patented Mar. 12, 1940

2,192,895

UNITED STATES PATENT OFFICE 2,192,895

OXYGEN FLOW REGULATOR FOR AIRCRAFT

Fidel Cordero, Washington, D. C.

Application March 4, 1938, Serial No. 193,949

6 Claims. (Cl. 137—153)

(Granted under the act of March 3, 1883, as amended April 30, 1928; 370 O. G. 757)

This invention relates to oxygen flow regulators and it has a particular relation to instruments for controlling the flow of oxygen to the mask or headpiece of an aviator at varying altitudes and atmospheric pressures.

One of the objects of the present invention is the provision of an improved oxygen flow regulator which is not only responsive to atmospheric pressures but which is also responsive to the decrease in pressure of the oxygen in the supply tank, thus, to obtain a uniformity of flow with variations in tank pressure without the necessity of providing two stages of pressure regulation, as in former instruments of this character.

Another object of the invention is the provision of an instrument, of the character described, which embodies a new and improved valve seat consisting of a boney structure, such as horn or the like, thus eliminating the shift previously encountered at the altitude at which the flow of oxygen commences.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 3 is a fragmentary enlarged vertical sectional view taken on line 3—3 of Fig. 1;

Fig. 4 is an enlarged transverse sectional view of the manually operable valve taken on line 4—4 of Fig. 1;

Fig. 5 is a similar view of the valve in another position;

Fig. 6 is a vertical sectional view on an enlarged scale of the safety check valve taken on line 6—6 of Fig. 1; and Fig. 7 is an enlarged horizontal sectional view on a larger scale of the adjustable abutment for the tank pressure responsive means taken on line 7—7 of Fig. 2.

Figure 1:
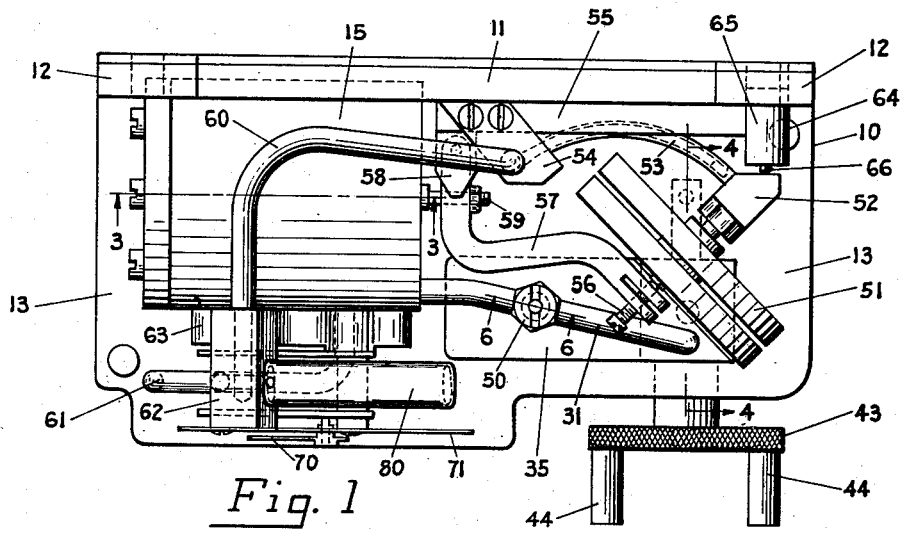
Fig. 1 is a plan view of an oxygen flow regulator embodying the invention with a portion of the enclosing casing removed.
Figure 2:
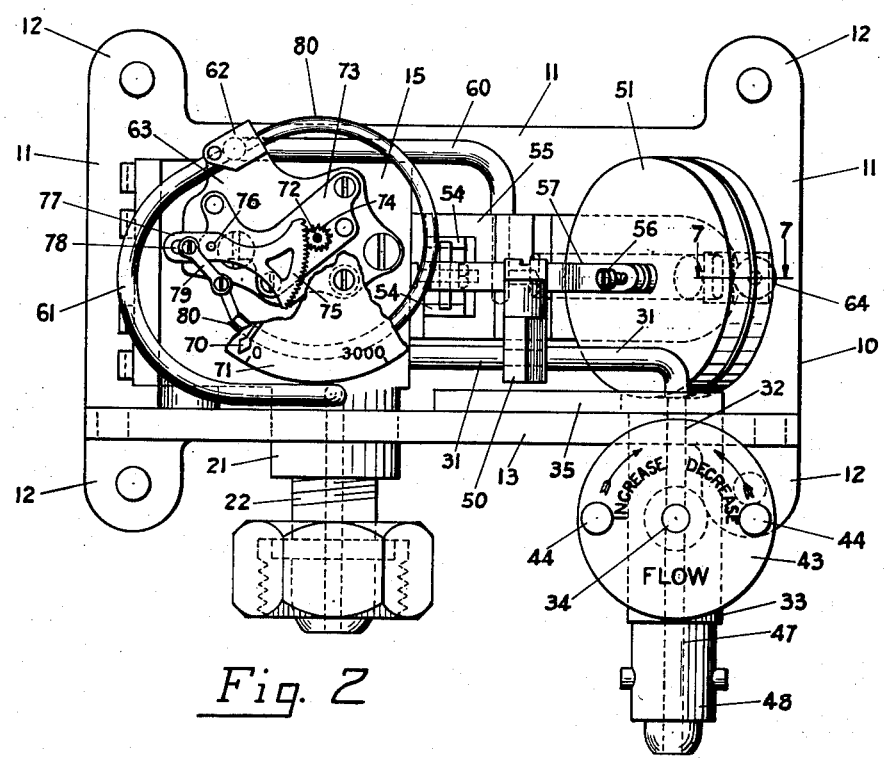
Fig. 2 is a front elevational view of the structure shown in Fig. 1.

Referring to the drawings, and particularly to Figs. 1 and 2 thereof, an oxygen flow regulator constructed in accordance with the present invention, is shown as comprising a support 10 formed with a vertically extending back plate 11 having ears 12 for attachment to the instrument panel of an airplane and a base plate 13 upon which the internal mechanism is mounted. This mechanism is normally enclosed by a cover, not shown, having a window through which the pressure indicating dial, hereinafter to be described, may be observed.

Mounted on the base plate 13 by screws 14 is a cylindrical pressure reducing chamber 15 (Fig. 3) which is closed at one end by a head 16 secured thereto by screws 17 and at the other end by a flexible metallic wall or diaphragm 18 which is permanently soldered or brazed in position. The chamber 15 is supplied with oxygen under pressure from a tank, not shown, through a pipe 19, the upper end of which terminated in a horizontally extending tapered nozzle 20 and the lower end of which communicates with a hollow boss 21 formed integrally with the chamber 15 and extending downwardly through an opening in the base plate 13. The nipple portion 22 of a pipe coupling, which is adapted to be connected with a supply line not shown, leading to the oxygen supply tank, is threaded into the boss 21 and a filter screen 23 is also disposed within the boss between the nipple 22 and the pipe 19. At low altitudes when there is no need for the aviator to use oxygen the supply thereof through the nozzle 20 is interrupted by a valve 24 having a valve seat in the form of an insert 25 of horn or other boney substance which is set in the valve 24 with the grain or foramina disposed axially in the valve 24. The valve 24 includes a stem 26 which is slidably mounted in a tubular projection or guide 27 carried by the cylinder head 16 and is urged into seating engagement with the nozzle 20 by a coil spring 28 surrounding the guide 27 between the head 16 and the valve 24. The valve mechanism also includes in its construction a yoke 29 which straddles the nozzle 20 and which is secured at one end to the valve 24 and at the other end to the diaphragm 18 by a screw 30 soldered or brazed thereto. By means of this construction when the diaphragm is flexed inwardly, in a manner hereinafter to be described, the valve 24 is unseated varying degrees against the action of the coil spring 28 so as to admit varying amounts of oxygen into the reducing chamber 15.

From the chamber 15 the oxygen flows to the mask or head-piece of the aviator through a pipe 31 which communicates with a passage 32 formed in the body 33 of a manually operated flow control valve, indicated as an entirety at 34. This valve body projects downwardly through an opening in the base plate 13 and is formed at its upper end with a laterally extending arm 35 which is secured to the base plate 13. The valve body 33 is also formed with a tapered seat 36 in which a correspondingly shaped valve member 37 is rotatably mounted and yieldably maintained in position by a coil spring 38. This spring surrounds an axial projection 39 of the valve member 37 between washers 40 and 41, the former abutting the valve body 33 and the latter engaging a cotter pin 42 extending through the projection 39. The other end of the valve member is provided with an operating handle in the form of a disk 43 having two diametrically disposed posts 44 secured thereto to facilitate manipulation. The valve member 37 is formed with a circumferential channel or passage 45 which communicates with a longitudinally extending groove 46 therein which at times registers with the passage 32, the channel 45 at all times registering with an outlet passage 47 formed in the valve body 37 and in a nipple 48 to which a flexible pipe, not shown, leading to the aviator's mask is adapted to be connected. The valve member 37 is also formed with a relatively narrow groove 49 of gradually diminishing cross-sectional area which is disposed in registry with the passage 32 and which communicates with the groove 46. Thus, it will be apparent that the valve member 37 may be turned from a position in which the groove 46 is in registry with the passage 32, in which position a maximum flow of oxygen is obtained, through positions in which different portions of the groove 49 is in registry with the passage 32, in order to obtain a gradually decreasing flow of oxygen, to a position beyond the end of the groove 49 in which the valve is closed and the flow of oxygen is interrupted. A ball check valve 50 (Fig. 6) of conventional construction is preferably located in the pipe 31 so as to vent the oxygen to atmosphere in the event that the pressure of the oxygen should, for some reason, exceed a predetermined maximum value.

The diaphragm 18 is flexed, in order to open and close the valve 24 at different atmospheric pressures, by means of an aneroid capsule in the form of an expansible and contractible metallic bellows 51 from which air has been partially exhausted. One face of this bellows is fixed to a block 52 which is, in turn, fixed to the closed movable end of a Bourdon tube 53. The other end of the Bourdon tube 53 is fixed in a block 54 carried by a bar 55 secured to the reduction chamber 15 and extending outwardly therefrom. The other face of the bellows 51 bears against an adjusting screw 56 carried by a lever 57 which is pivotally mounted between ears 58 formed on the bar 55. This lever also carries an adjusting screw 59 for engagement with the outer end of the screw 30 fixed in the flexible diaphragm or end wall 18 of the reduction chamber 15. By means of this construction when the pressure of the atmosphere decreases with increased elevation the bellows 51 will expand and swing the lever 57 about its pivot so as to cause the screw 59 to bear against the screw 30 and flex the diaphragm 18 inwardly. This will force the yoke 29 inwardly and open or crack the valve 24, thus permitting oxygen in amounts proportional to the elevation to flow to the aviator's mask. This flow of oxygen may also be additionally controlled by the manually operable valve 34, previously described. The inner or fixed end of the Bourdon tube 53 communicates through the block 54 with a tube 60 which, in turn, communicates with a tube 61 through a block 62 carried by a bracket 63 which is secured to the side of the chamber 15. The tube 61 communicates through the boss 21 with the source of oxygen in the storage tank. Thus, it will be seen that as the pressure of the supply of oxygen decreases the curvature of the Bourdon tube 53 correspondingly increases and shifts the aneroid capsule carried thereby to the left, as viewed in Fig. 1. This will swing the lever 57 through a still greater arc and open the valve 24 sufficiently to maintain the volume of oxygen flowing to the aviator's mask substantially constant notwithstanding the decreasing pressure in the oxygen storage tank.

The flexing movement of the Bourdon tube 53 may be regulated according to the initial pressure in the storage tank by means of an adjustable yieldable abutment, indicated generally at 64 (Fig. 7). This abutment comprises a barrel 65 which is fixed to the outer end of the bar 55 and in which a plunger 66 is slidably mounted for engagement with the block 52 on the free end of the Bourdon tube 53. This plunger is urged outwardly by a coil spring 67 interposed between a collar 68 on the plunger and an adjustable screw 69 threaded into the rear end of the barrel 65. This adjustment is made at the factory and the screw 69 is normally inaccessible.

The pressure within the oxygen storage tank is indicated by a pointer 70 which traverses a dial 71 fixed to the block 62. The pointer 70 is secured to a shaft 72 journalled in a box frame 73 carried by the bracket 62 and has a pinion 74 fixed thereto for intermeshing engagement with a segmental rack 75. This rack is pivotally mounted on a pin 76 fixed in the frame 73 and is provided with an arm 77 having a slot 78 formed therein in which one end of a link 79 is pivotally and slidably mounted. The other end of the link 79 is pivotally connected with the free end of a second Bourdon tube 80, the opposite end of which is fixed in the block 62 and communicates with the supply of oxygen in the storage tank through the tube 61. By means of this construction the pressure in the supply tank causes a flexing of the Bourdon tube 80, the motion of which is transmitted through the described mechanism to the pointer 70.

From the foregoing it will be apparent that a very flexible and accurate oxygen flow regulator is provided and one that is responsive to the pressure within the storage tank as well as to atmospheric pressure.

The structure hereinabove described may be modified in proportion and arrangement of the parts by those skilled in the art without departing from the nature and scope of the invention as defined in the appended claims.

The invention described herein may be manufactured and/or used by or for the Government of the United States of America for governmental purposes without the payment of any royalties thereon or therefor.

I claim:

1. An oxygen flow regulator for aircraft comprising a receptacle adapted to be connected with a tank containing oxygen under pressure and with a mask or head-piece, a valve for controlling the flow of oxygen from said tank to said receptacle, an aneroid capsule responsive to atmospheric pressure for actuating said valve, and means responsive to the pressure of the oxygen in said tank for shifting the position of said capsule to maintain its operative relation to said valve with variations in tank pressure.

2. In an oxygen flow regulator, a valve for controlling the flow of oxygen from a source of supply to a mask or head-piece, an aneroid capsule responsive to atmospheric pressure for actuating said valve, and means responsive to the pressure of the oxygen at said source for shifting the position of said capsule to maintain its operative relation to said valve with variations in the pressure at said source.

3. In an oxygen flow regulator, a valve for controlling the flow of oxygen from a source of supply to a mask or head-piece, an aneroid capsule responsive to atmospheric pressure for operating said valve, and a Bourdon tube movably supporting said capsule and communicably connected with said source and responsive to the pressure thereof for varying the extent of movement of said valve to obtain uniformity in the volume of oxygen flowing therethrough at different pressures at said source.

4. In an oxygen flow regulator, a valve for controlling the flow of oxygen from a source of supply to a mask or head-piece, an aneroid capsule responsive to atmospheric pressure for operating said valve, and a Bourdon tube movably supporting said capsule and responsive to the pressure of said source for varying the extent of movement of said valve in accordance with the pressure of the oxygen at said source.

5. In an oxygen flow regulator, a valve for controlling the flow of oxygen from a source of supply to a mask or head-piece, said valve having a valve seat of boney structure with its grain disposed axially of said valve to prevent the shifting of said seat laterally, means responsive to atmospheric pressure for operating said valve, and means responsive to the pressure of the oxygen at said source for varying the extent of movement of said valve in accordance with the pressure of the oxygen at said source.

6. In an oxygen flow regulator, a valve for controlling the flow of oxygen from a source of supply to a mask or head-piece, said valve having a valve seat constructed from horn with its grain disposed axially of said valve to prevent the shifting of said seat laterally, means responsive to atmospheric pressure for operating said valve, and means responsive to the pressure of the oxygen at said source for varying the extent of movement of said valve in accordance with the pressure of the oxygen at said source.

FIDEL CORDERO.